United States Patent [19]

MacMunn et al.

[11] 4,227,666
[45] Oct. 14, 1980

[54] BLOCK CONTROL SYSTEM FOR SELF-PROPELLED VEHICLES

[75] Inventors: George D. MacMunn, Southfield; Ward T. Brennan, Royal Oak, both of Mich.

[73] Assignee: Jervis B. Webb Company, Farmington Hills, Mich.

[21] Appl. No.: 906,988

[22] Filed: May 18, 1978

[51] Int. Cl.³ .................... B61L 21/06; B61L 21/10
[52] U.S. Cl. ........................ 246/187 C; 246/131
[58] Field of Search ............ 246/187 C, 187 B, 34 R, 246/40, 63 R, 167 R, 131–133; 104/153, 149, 94, 107, 108; 191/6, 23 A, 57

[56] References Cited

U.S. PATENT DOCUMENTS

| | | | |
|---|---|---|---|
| 1,418,151 | 5/1922 | Lindig | 191/6 |
| 1,877,626 | 9/1932 | Loughridge | 246/187 C |
| 3,963,203 | 6/1976 | Pascoe | 246/131 |

*Primary Examiner*—Reinhard J. Eisenzopf
*Attorney, Agent, or Firm*—Joseph W. Farley

[57] ABSTRACT

A block control system for wheeled, track-mounted vehicles each having a driving motor energized from power conductor rails extending parallel to the track through collector shoes mounted on the vehicle. A track layout is provided with two or more successive traffic control blocks each having a signalling section of conductor bar electrically connected to a blocking section of conductor bar in the next trailing block. The signalling and blocking conductor bar sections are engageable respectively by separate signalling and blocking contact shoes carried by each vehicle. A block control relay on each vehicle includes a contact in series with the vehicle driving motor control circuit, and the operational state of this relay is controlled by a circuit which is established through the signalling and blocking contact shoes and the conductor bar sections engaged thereby and which applies a blocking signal to the relay of a vehicle in a trailing block in response to the presence of a vehicle in a leading block. Alternative constructions are disclosed for stopping the vehicle in response to energization or to de-energization of the relay, and for controlling the relay by trackside-mounted circuits.

15 Claims, 8 Drawing Figures

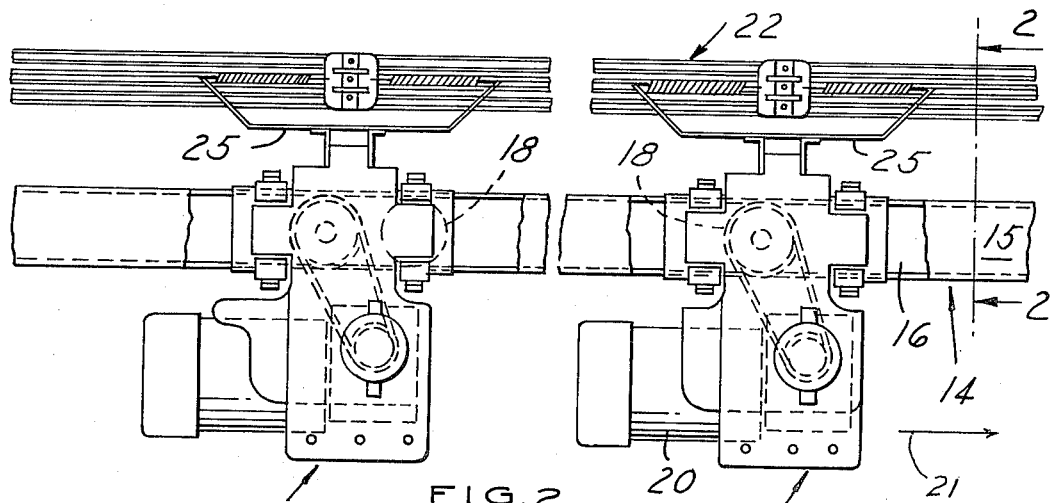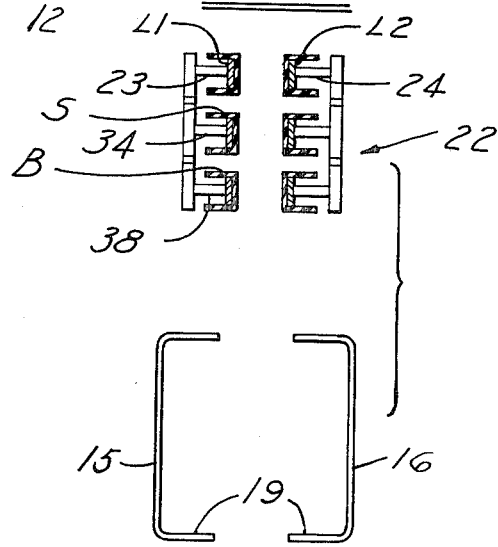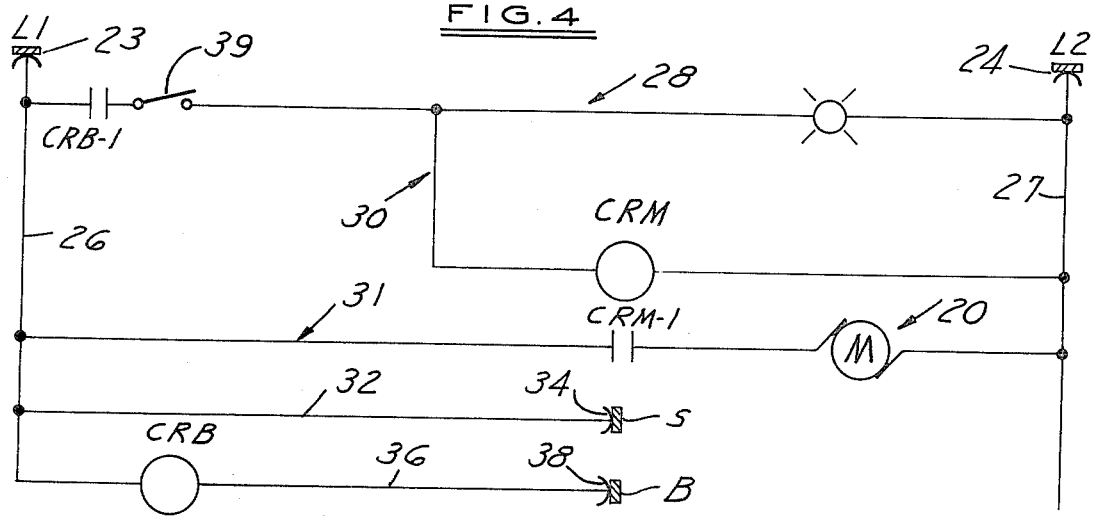

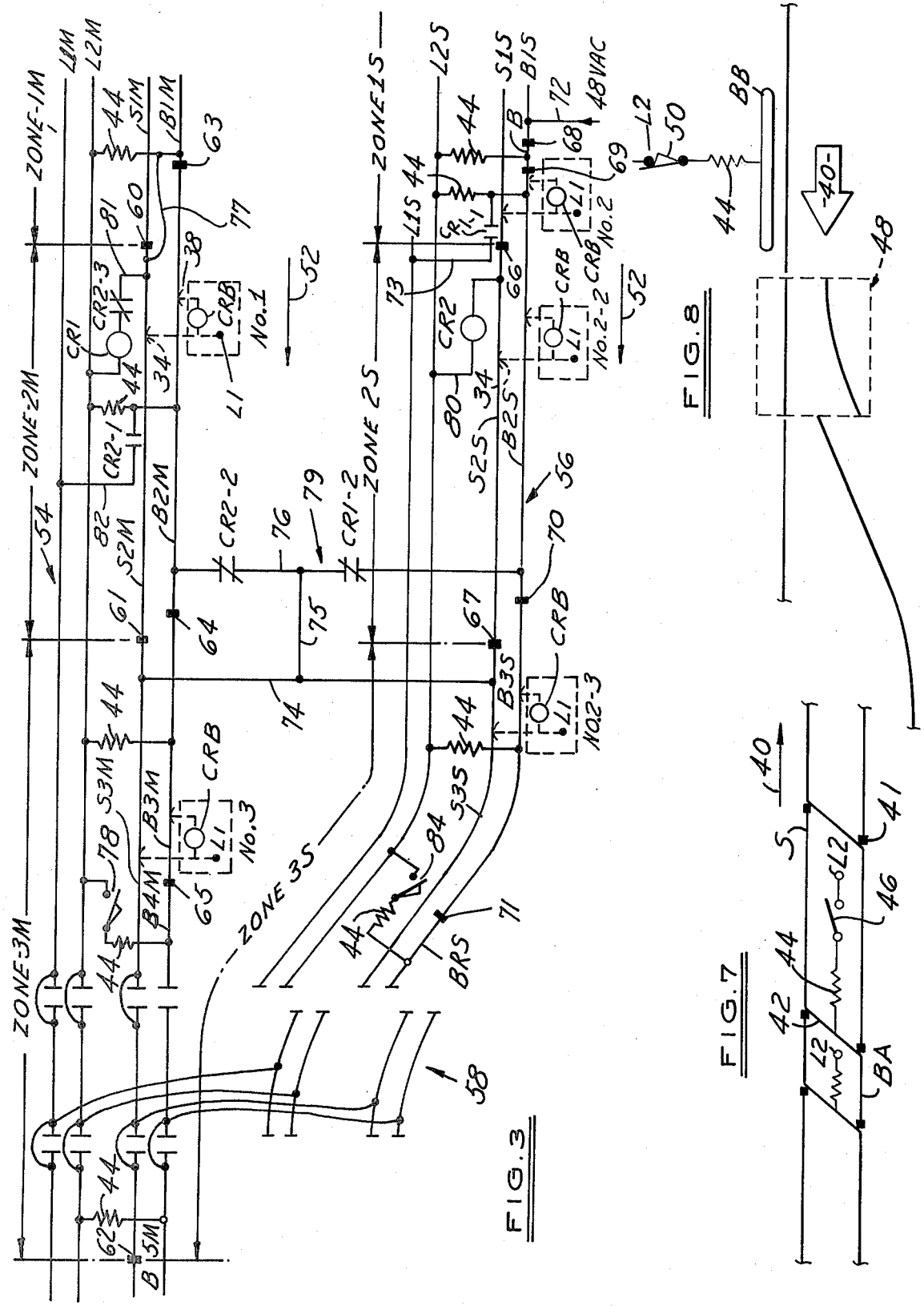

BLOCK CONTROL SYSTEM FOR SELF-PROPELLED VEHICLES

This invention relates to a block control system for self-propelled vehicles of the type, sometimes called "monotractors", which travel along a supporting track, each vehicle being propelled by a driving motor powered from conductor rails through collector shoes mounted on the vehicle. In the block control system of the invention, a track layout for monotractor vehicles is provided with two or more blocks according to the requirements for traffic control, there being at least a first block and a second block. The control system enables a vehicle in the second block to be stopped in response to the presence of a vehicle in the first block by a simple arrangement of signalling and blocking conductor bar sections engaged by separate contact shoes on each vehicle.

To summarize the block control system of the invention for vehicles of the type described above, a signalling conductor bar and a blocking conductor bar each extend parallel to the conductor rails from which the vehicle derives its motive power. These conductor bars are each divided into a plurality of sections by insulators so that one section of signalling conductor bar is located in a first traffic control block and one section of blocking conductor bar is located in a second traffic control block. The signalling conductor bar section is electrically connected to the blocking conductor bar section. Each vehicle has at least a pair of collector shoes engaging the conductor rails and connected to a power circuit for the vehicle driving motor. A signalling contact shoe and a blocking contact shoe on each vehicle are respectively engageable with the signalling and blocking conductor bars and are electrically connected to at least one side of the power circuit. Each vehicle is also provided with a block control relay which has a contact so arranged in the power circuit as to control the energization of the vehicle driving motor. The operational state of the block control relay is regulated by circuit means responsive to a block signal applied to the blocking conductor bar section in the second traffic control block through the signalling contact shoe of a vehicle in the first traffic control block, this circuit means including on each vehicle a connection from the blocking collector shoe to the block control relay whereby the driving motor of a vehicle in the second traffic control block is de-energized in response to the block signal.

Alternative arrangements may be employed for the block control relay and the circuit means for regulating the operational state thereof. In one of these arrangements, the block control relay is provided with a normally closed contact in series relation with the power circuit for the vehicle driving motor, and the circuit means is responsive to a block signal which energizes the block control relay and causes the normally closed contact to open, thus interrupting the power circuit for the vehicle driving motor. The second arrangement is the reverse in the sense that the block control relay is provided with a normally open contact in series with the power circuit for the vehicle driving motor and requires the block control relay to be energized in order for this normally open contact to be closed and the vehicle driving motor to run. In this alternative arrangement, the circuit means is responsive to a block signal which shunts the block control relay, thereby de-energizing it and stopping the vehicle driving motor. The second arrangement is preferred because of its fail-safe characteristics.

Another preferred feature of the invention is that the circuit means for regulating the operational state of the block control relay may in turn be regulated by trackside-mounted switch components operated either manually or automatically. A manual switch is employed where it is desired to stop a vehicle at a certain location by a manual control; and, an automatic type of switch is employed, for example, when it is desired to stop a vehicle in response to a certain setting of a track switch at a junction between main and branch paths in the vehicle supporting track, or when it is desired to control the movements of two vehicles approaching a junction, or merge zone, on separate paths of travel.

Other features and advantages of the invention will appear from the following description of the representative embodiments thereof shown in the accompanying drawings.

DESCRIPTION OF THE DRAWINGS

FIG. 1 is a side elevation showing a representative type of self-propelled vehicles operable with the block control system of the invention;

FIG. 2 is an enlarged sectional elevation, taken as indicated by the line 2—2 of FIG. 1, and schematically showing the supporting track, power rails and conductor bars;

FIG. 3 is a schematic plan view of a merge zone of a traffic path illustrating the use of various features of the block control system of the invention;

FIG. 4 is a circuit diagram of a control circuit for a vehicle driving motor operable by the block control system of the invention;

FIG. 7 is a schematic diagram illustrating a manual operation of the block control system of FIG. 5; and, FIG. 8 is a schematic plan view showing components for traffic control at a track switch.

DESCRIPTION OF THE PREFERRED EMBODIMENTS

Figure 5:
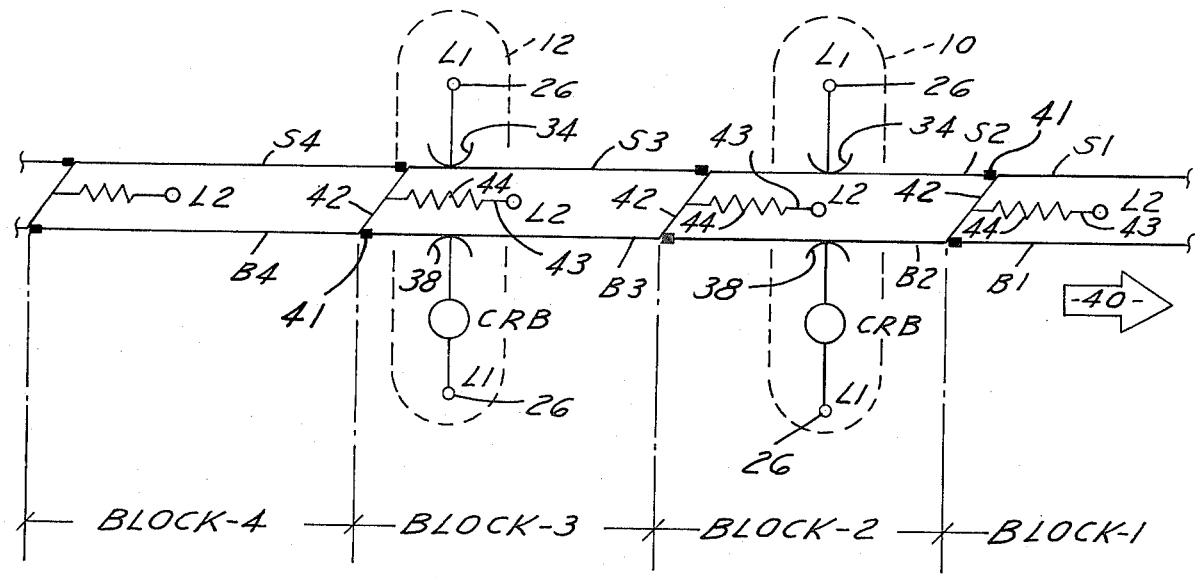
FIG. 5 is a schematic diagram illustrating the operation of one form of block control system of the invention.

FIGS. 1 and 2 illustrate a leading self-propelled vehicle 10 and a trailing self-propelled vehicle 12 mounted on a supporting track 14 composed of a pair of channel-section rails 15 and 16 arranged as shown in FIG. 2. Each of the vehicles 10 and 12 has wheels 18 engaging the lower flanges 19 of the rails 15 and 16 and has a driving motor 20 connected by a power train to at least one of the wheels 18. A conductor assembly 22 is located above the supporting track 14 and includes conductor rails L1 and L2 of a power source. These conductor rails extend parallel to the supporting track 14 and are engageable by collector shoes 23 and 24 (FIG. 2) carried by suitable brackets 25 attached to each of the vehicles to supply power for driving the vehicles in the direction indicated by the arrow 21.

As shown in FIG. 4, the collector shoes 23 and 24 are respectively connected to lines 26 and 27 of a power circuit 28 on the vehicle for energizing the driving motor 20. For simplicity, FIG. 4 shows schematically only those elements of the power circuit directly involved in the operation of the block control system of the present invention, including a motor control circuit 30 and a motor energizing circuit 31 connected between the lines 26 and 27. A signalling circuit 32 connects a signalling contact shoe 34 to the power line 26; and, a blocking circuit 36 connected to the power line 26 includes a block control relay CRB and a connection thereto from a blocking contact shoe 38. These contact shoes 34 and 38 are respectively engageable with signalling and blocking conductor bars S and B, which, as shown in FIG. 2, form part of the conductor assembly 22 and extend parallel to the conductor rails L1 and L2, the signalling conductor bar S being spaced transversely from the blocking conductor bar B in relation to the length of the conductor assembly 22.

The motor control circuit 30 is provided with a start-stop switch 39, a motor control relay CRM and a normally open block control relay contact CRB-1 in series relation. A normally open motor control relay contact CRM-1 is provided in the motor energizing circuit 31.

FIG. 5 schematically illustrates a block control system for vehicles each equipped with a power circuit 28 such as described above and illustrated in FIG. 4. In FIG. 5, a series of successive leading and trailing traffic control blocks are labelled Block 1, Block 2, Block 3 and Block 4, with a leading vehicle 10 shown in Block 2 and a trailing vehicle 12 shown in Block 3 travelling in the direction of the arrow 40. The signalling conductor bar S and the blocking conductor bar B are each sectionalized between the blocks by insulators 41. As a result, and referring to the leading Block 2 and the trailing Block 3, a signalling conductor bar section S2 extends along the leading traffic control Block 2, and a blocking conductor bar section B3 extends along the trailing Block 3. The signalling conductor bar section S2 is electrically connected to the blocking conductor bar section B3 by a jumper 42 and is also connected by a jumper 43 to the power conductor rail L2 through a resistance 44. It can be seen that the same pattern and electrical connections are employed for each leading and trailing traffic control block—the signalling conductor bar section S1 of Block 1 being connected by a jumper 42 to the blocking conductor bar section B2 of Block 2 and to conductor rail L2 through a jumper 43 and a resistance 44; and the signalling conductor bar section S3 of Block 3 being connected by a jumper 42 to the blocking conductor bar section B4 of Block 4 and to the conductor rail L2 through a resistance 44 and jumper 43.

Considering first the leading vehicle 10 in Block 2, the block control relay CRB of this vehicle is energized by a circuit extending from line 26, or the L1 side of the vehicle power control circuit 28, through the control relay CRB, the blocking contact shoe 38, the blocking conductor bar section B2, the jumpers 42 and 43 and the resistance 44 to conductor rail L2. Thus the normally open contact CRB-1 in series with the motor control circuit 30 of FIG. 4 is closed and the motor 20 of the leading vehicle 10 is energized. With the leading vehicle 10 in Block 2, the following vehicle 12 entering Block 3 will have its control relay CRB de-energized by a block signal applied by the vehicle 10 to a shunt circuit extending from the blocking contact shoe 38 of the vehicle 12 through the blocking conductor bar section B3, the jumper 42, the signalling conductor bar section S2 of Block 2, the signalling contact shoe 34 of the leading vehicle 10 to the line 26 or L1 side of the power circuit 28 of the leading vehicle 10.

The resistance 44 connecting the signalling conductor bar section S2 and the blocking conductor bar section B3 to conductor rail L2 through the jumper 43 is sized to drop the voltage from the power source value (L1 to L2) to the voltage required to operate the coil of the block control relay CRB. For example, if the voltage between L1 and L2 is 115 VAC and a 48 VAC coil is used in the block control relay CRB, the resistor is sized to drop 67 volts (115 minus 48 equals 67). Thus the block control relay CRB of the trailing vehicle 12 is shunted and drops out, opening the relay contact CRB-1 in the power control circuit of the trailing vehicle 12, de-energizing the driving motor 20 thereof and causing the trailing vehicle to stop. The trailing vehicle will remain stopped until the leading vehicle 10 moves out of Block 2, removing the block signal being applied through the shunt circuit to the block control relay CRB of the trailing vehicle 12, which relay will then be re-energized and cause forward motion of the trailing vehicle to resume. This block control system functions on a fail-safe basis, since the block control relay of a vehicle must be energized in order for forward motion of the vehicle to take place.

Figure 6:
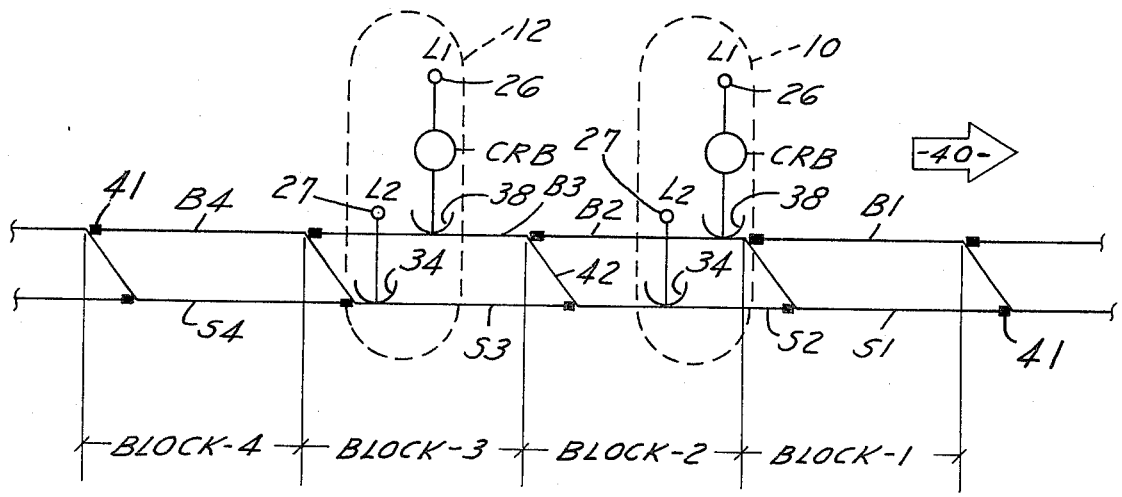
FIG. 6 is a schematic diagram similar to FIG. 5 but for an alternative form of block control system of the invention.

An alternative form of block control system is schematically shown in FIG. 6. This system is similar to the system of FIG. 5 except that the signalling contact shoe 34 of each vehicle is electrically connected to line 27, or the L2 side of the vehicle power circuit 28, and that the block control relay contact CRB-1 is a normally closed contact. In other words, the motor control circuit 30 in this alternative system is closed when the block control relay CRB is de-energized.

Considering the leading vehicle 10 in FIG. 6, the block control relay CRB thereof is de-energized because there is no circuit completing a connection between the line 26, or L1 side of the power circuit of this vehicle, through the block control relay CRB and blocking contact shoe 38 to the other side of the power source. However, with the leading vehicle 10 in Block 2 as shown, a trailing vehicle 12 entering Block 3 will have its block control relay CRB energized by a circuit extending from the L1 side of the power circuit 26 of the trailing vehicle 12, through the block control relay CRB thereof, the blocking contact shoe 38, the blocking conductor bar section B3, the jumper 42, the signalling conductor bar section S2 in Block 2, the signalling collector shoe 34 of the leading vehicle 10, to the power line 27, or L2 side of the power circuit 28 of the leading vehicle. Energization of the block control relay CRB of the trailing vehicle will open the normally closed contact CRB-1 in series with the motor control circuit of the trailing vehicle, causing this vehicle to stop, and to remain stopped until the leading vehicle 10 moves out of Block 2.

While the block control system of FIG. 5 is preferred because of its fail-safe nature, as stated above, the systems of FIGS. 5 and 6 are similar in the sense that each includes circuit means for regulating the operational state of the block control relay so that the driving motor of the vehicle 12 in the trailing traffic control block is de-energized in response to a block signal applied to the blocking conductor bar section through the signalling contact shoe of the vehicle 10 in the leading traffic control block, and this circuit means includes a connection from the blocking collector shoe 38 of the trailing vehicle to the block control relay CRB of that vehicle.

FIGS. 7 and 8 illustrate ways in which a block signal may be applied to a blocking conductor bar section through trackside-mounted switch means. In FIG. 7, a manual stop for a vehicle, equipped with the block control system of FIGS. 4 and 5, is provided by a blocking conductor bar section BA connected to power rail L2 through a resistance 44 and a manually controlled switch 46. With the switch 46 open, as shown, a vehicle travelling in the direction of the arrow 40, and having its blocking shoe 38 contact the blocking conductor bar section BA, will stop because the circuit from the L1 side of the power source through the block control relay of the vehicle to the L2 side of the power source is interrupted at the switch 46.

FIG. 8 shows an arrangement in which a section of blocking conductor bar BB is provided in advance of a track switch 48 and is connected to the L2 side of the power source through a resistance 44 and a limit switch 50 which is operated by the track switch and is open whenever the track switch is not in its main or branch line position. When the limit switch 50 is open, any vehicle whose blocking contact shoe 38 comes in contact with the blocking section of conductor bar BB will stop, as explained above in connection with the manual switch of FIG. 7, thus preventing the vehicle from entering an open track switch.

FIG. 3 further illustrates the foregoing and other control features of the invention as applied to regulate the movement of vehicles through a merge zone of a track layout. Vehicles enter the merge zone travelling in the direction indicated by the arrows 52 on a main line 54 or on a spur line 56 which merges with the main line 54 at a track switch 58 shown in main line position. For simplicity, the main and spur line vehicle supporting tracks have not been included in FIG. 3, but these tracks extend parallel to the main line power rails L1M and L2M and to the spur line power rails L1S and L2S, respectively, as will be understood from FIGS. 1 and 2.

Along both the main line 54 and the spur line 56, the signalling and blocking conductor bars are divided into electrically isolated sections by insulators, thus defining successive traffic control zones labelled ZONE 1M, ZONE 2M and ZONE 3M on the main line 54, and labelled ZONE 1S, ZONE 2S and ZONE 3S on the spur line 56. The main line signalling conductor bar includes a section S1M extending to an insulator 60, a section S2M extending between the insulator 60 and an insulator 61, and a section S3M extending from the insulator 61 to an insulator 62 and electrically connected to main and spur line signalling conductor bar sections of the track switch 58. The main line blocking conductor bar includes a section B1M extending to an insulator 63, a section B2M between the insulator 63 and an insulator 64, a section B3M from the insulator 64 to an insulator 65, a section B4M extending from the insulator 65 to the track switch 58, and a section B5M electrically connected to and including main and spur line track switch sections of blocking conductor bars. On the spur line 56, insulators 66 and 67 divide the signalling conductor bar into sections S1S, S2S and S3S, and the blocking conductor bar is divided into sections B1S, B, B2S, B3S and B4S by insulators 68, 69, 70 and 71.

The arrangement shown in FIG. 3 is for use with vehicles equipped with the power and block control relay circuit of FIGS. 4 and 5, wherein the motor 20 of a vehicle can be energized only when the block control relay CRB of that vehicle is energized, and wherein the block control relay CRB is energized by circuit means extending from the L1 side of the power supply through the relay CRB to the blocking conductor bar which is either connected to the L2 side through a voltage dropping resistor 44, as previously described, or is energized by a voltage sufficient to operate the relay CRB.

Such an energized section is one along which block control of vehicle movement is not desired, and is illustrated by the section B1S. An energizing voltage for the block control relays of traversing vehicles is applied to this section B1S, as indicated by the line 72 which supplies 48 VAC for the block control relay, as in the example previously given herein. Section B isolates section B1S from section B2S so that these sections cannot be bridged and connected together by a block contact shoe 38 of a vehicle, which would short the 48 VAC supply when section B2S is connected to the L1 supply.

In the merge zone of FIG. 3, the circuit means for energizing the block control relay CRB of a vehicle is selectively disabled by the application of a blocking signal from another vehicle, or from a traffic control means responsive to the presence of another vehicle, or by opening the circuit means as previously described in connection with FIG. 8. The traffic control means includes traffic control relays CR1 and CR2 and their associated contacts.

Traffic control relay CR2 is connected in a line 80 between the spur line signalling conductor bar section S2S and the spur line power rail L2S; and relay CR2 is energized in response to conductor bar section S2S being contacted by the signalling collector shoe 34 of a vehicle, completing a circuit through the relay from the L1 side of the power source on the vehicle to the L2 side of the power source at the rail L2S. A normally open contact CR2-1 of the relay CR2 is located in a shunt circuit 82 connecting the main line power rail L1M to the main line blocking conductor bar section B2M so that when the relay CR2 is energized, an L1 blocking signal is applied to section B2M by the closing of the contact CR2-1, thereby stopping traffic at the entrance side of ZONE 2M in response to the presence of a vehicle in ZONE 2S.

Traffic control relay CR1 is connected in series with a normally closed contact CR2-3 of the relay CR2 by a line 81 extending between the signalling conductor bar section S2M and the main line power rail L2M; and, relay CR1 is energized in response to the section S2M being engaged by the signalling contact shoe 34 of a vehicle. A normally open contact CR1-1 of the relay CR1, when closed by the energization thereof, supplies an L1 blocking signal to the spur line blocking conductor bar section B2S through a circuit 73.

Relay CR1 controls traffic at the entrance side of ZONE 2S in response to the presence of a vehicle in ZONE 2M, and is in turn controlled by the normally closed contact CR2-3 so that preference is given to traffic on the spur line.

The traffic control relays CR1 and CR2 also regulate the application of a blocking signal from a vehicle on the main line to a vehicle on the spur line, and vice versa, by normally closed contacts CR1-2 and CR2-2 in a gating circuit 79. In this circuit, the main and branch line signalling conductor bar sections S3M and S3S are connected together by a line 74 and are connected through lines 75, 76 and normally closed contacts CR1-2 and CR2-2 to the main and branch line blocking conductor bar sections B2M and B2S. Contact CR1-2 thus controls the connection of S3M and S3S to B2S, while contact CR2-2 controls the connection of S3M and S3S to B2M.

To describe the operation of the merge control zone of FIG. 3, it will first be assumed that a vehicle, marked No. 1 in FIG. 3, enters ZONE 2M. The signalling collector shoe 34 of this vehicle No. 1 supplies L1 to the conductor bar section S2M and from this section to L2M through line 81, the normally closed contact CR2-3 and the control relay CR1. This circuit energizes the control relay CR1 which remains energized while the vehicle No. 1 is in ZONE 2M. Contact CR1-1, in the connection 73 from L1S to blocking conductor bar section B2S, closes, thus supplying a blocking signal which will cause a vehicle No. 2 approaching on the spur line to stop in ZONE 1S into which section B2S extends.

If at this time there is a vehicle No. 3 on the main line in ZONE 3M, an L1 blocking signal is applied by this vehicle No. 3 through signalling conductor bar section S3M, gating circuit 74–76 and normally closed contact CR2-2 to the blocking conductor bar section B2M. Vehicle No. 1 will then remain stopped in ZONE 2M and will apply an L1 blocking signal through jumper 77 to blocking conductor bar section B1M in ZONE 1M.

As vehicle No. 3 proceeds through ZONE 3M, if the track switch 58 is not in the main line position shown in FIG. 3, a limit switch 78 in a connection from blocking conductor bar section B4M will be open, disconnecting the L2 side of the block control relay circuit means and causing the vehicle to stop when its collector shoe 38 contacts section B4M. When vehicle No. 3 clears ZONE 3M, the L1 blocking signal is removed from section B2M and vehicle No. 1 can proceed into ZONE 3M, thus de-energizing the control relay CR1 to remove the blocking signal from ZONE 1S, and also removing the blocking signal from section B1M.

Vehicle No. 2 can now proceed into ZONE 2S (as illustrated by the vehicle marked No. 2-2) and will energize the control relay CR2. The energization of control relay CR2 will prevent the re-energization of control relay CR1 by opening the normally closed contact CR2-3 in the circuit 81 to CR1. If there were a vehicle in ZONE 3M, vehicle No. 2 would be held in ZONE 2S by an L1 blocking signal applied by the ZONE 3M vehicle to blocking conductor bar section B2S through lines 74, 75 and the normally closed CR1-2 contact in line 76. If there is no vehicle in ZONE 3M, vehicle No. 2 will advance into ZONE 3S (as indicated by the vehicle marked No. 2-3) de-energizing relay CR2 and applying a blocking signal to ZONE 2M through the gating circuit 74–76 and the normally closed contact CR2-2; and, if the track switch 58 has been moved to its spur line position as indicated by the closing of a limit switch 84 connected to the blocking conductor bar section B4S, vehicle No. 2 will proceed through ZONE 3S.

If a vehicle enters the merge zone of FIG. 3 on the spur line before another vehicle enters on the main line, the control arrangement illustrated gives preference to the spur line vehicle which will energize relay CR2 and prevent the energization of relay CR1 by the now open CR2-3 contact in series therewith. As the spur line vehicle moves forward, it will cause a blocking signal to be successively applied to ZONES 1M and 2M through the contact CR2-1, and to ZONE 2M through the gating circuit 74–76 and the relay contact CR2-2 until the vehicle clears ZONE 3S. It will be appreciated that preference must be given to either the main or the spur line; otherwise the simultaneous presence of vehicles in ZONES 2M and 2S would result in each blocking forward movement of the other if a vehicle responsive control relay were used on each line, as shown in FIG. 3.

We claim:

1. A block control system for wheeled, self-propelled vehicles mounted on a supporting track, each vehicle having a driving motor and collector shoes engageable with conductor rails of a power source extending parallel to the supporting track for energizing a power circuit for the driving motor; a signalling conductor bar and a blocking conductor bar each extending parallel to said conductor rails, and insulation means dividing each conductor bar into a plurality of sections with one section of signalling conductor bar being located in a first traffic control block and one section of blocking conductor bar being located in a second traffic control block; means for electrically connecting said signalling conductor bar section to said blocking conductor bar section; a signalling contact shoe and a blocking contact shoe on each vehicle, said contact shoe being respectively engageable with said signalling and blocking conductor bars, said contact shoes being electrically connected to at least one side of said power circuit; a block control relay on each vehicle, said relay having a contact in series relation with said power circuit for the vehicle driving motor; block control relay circuit means for regulating the operational state of said relay whereby the driving motor of a vehicle in said second traffic control block is de-energized in response to a block signal applied to said blocking conductor bar section, said circuit means including a connection from the blocking contact shoe of each vehicle to the block control relay of that vehicle, an enabling connection from one side of the power source to said blocking conductor bar section, vehicle carried means connecting the other side of the power source through the block control relay to said blocking contact shoe for energizing the block control relay; and shunt circuit means for connecting said other side of the power source to said blocking conductor bar section whereby the block control relay is de-energized in response to a block signal applied by said shunt circuit means; wherein the improvement comprises a traffic control relay, switch means operable by said traffic control relay for closing said shunt circuit means, and circuit means for energizing said traffic control relay in response to engagement of said signalling conductor bar section by said signalling contact shoe of a vehicle.

2. A block control system according to claim 1 wherein said traffic control relay includes a contact in said means for electrically connecting said signalling conductor bar section to said blocking conductor bar section.

3. In a traffic layout having a main line, a spur line merging therewith at a merge zone including a track switch, and wheeled, self-propelled vehicles operable on said traffic layout, each vehicle having a driving motor and collector shoes engageable with conductor rails of a power source extending along said main and spur lines for energizing a power circuit for the driving motor, the improvement comprising:

main and spur line signalling conductor bars extending parallel to said conductor rails, and insulating means dividing said conductor bars into a plurality of sections, each section defining a traffic control zone;

main and spur line blocking conductor bars extending parallel to said signalling conductor bars, and insulating means dividing said blocking conductor bars into a plurality of sections;

each vehicle having a signalling contact shoe and a blocking contact shoe engageable respectively with said signalling and blocking conductor bars, a block control relay including a contact operable to energize said power circuit for the vehicle driving motor in response to energization of said block control relay; and, block control relay circuit means for regulating the operational state of said relay, said circuit means including on each vehicle a connection from one side of the power circuit on the vehicle through said relay to the blocking contact shoe of the vehicle, enabling circuits each connecting a certain section of said blocking conductor bars to the other side of the power source, at least one traffic control relay, and shunt circuit means operable by said traffic control relay for connecting a selected blocking conductor bar section to said one side of the power source in response to engagement of the signalling contact shoe of a vehicle with a selected section of said signalling conductor bars.

4. A traffic layout according to claim 3 wherein said shunt circuit means includes blocking signal means on each vehicle for connecting the signalling contact shoe to said one side of the power circuit on the vehicle, means for energizing said traffic control relay in response to the application of a blocking signal from a vehicle to said selected section of said signalling conductor bar, and contact means operative by said traffic control relay for controlling the connection of said selected blocking conductor bar section to said one side of the power source.

5. A traffic control layout according to claim 3 wherein said merge zone includes successive leading and trailing traffic control zones in advance of said track switch on each of said main and spur lines, and said shunt circuit means includes blocking signal means on each vehicle for connecting the vehicle's signalling contact shoe to said one side of the power circuit on the vehicle, main and spur line traffic control relays operable in response to the application by a vehicle of a blocking signal to the respective one of the main and spur line sections of signalling conductor bar located in said leading traffic control zone, said main line traffic control relay having first contact means for connecting a spur line section of blocking conductor bar to said one side of the power source, said spur line traffic control relay having first contact means for connecting a main line section of blocking conductor bar to said one side of the power source, and one of said main and spur line traffic control relays having second contact means for controlling the response of the other of said traffic control relays to a blocking signal.

6. A traffic control layout according to claim 5 wherein said shunt circuit means further includes a gating circuit connecting main and spur line sections of signalling conductor bars located in said trailing traffic control zone to main and spur line sections of blocking conductor bars located in said leading traffic control zones, said gating circuit including third contact means operable by said main and spur line traffic control relays.

7. A block control system for self-propelled vehicles operable on a track layout having main and spur line tracks connected by a track switch; and insulated sections of main and spur line signalling and blocking conductor bars extending parallel to the main and spur line tracks; each vehicle having a driving motor, a power circuit therefor energizable through collector shoes engageable with conductor rails of a power source extending parallel to the main and spur line tracks, a block control relay operable to control the energization of the driving motor, a signalling contact shoe and a blocking contact shoe connected to the power circuit and engageable respectively with the signalling and blocking conductor bars, the block control relay being connected to the blocking contact shoe and being operable in response to the potential applied to the section of blocking conductor bar engaged by the blocking contact shoe; wherein the improvement comprises:

a first traffic control relay connected to a selected section of signalling conductor bar and to one side of the power source is energizable in response to engagement of the selected section of signalling conductor bar by the signalling contact shoe of a vehicle through the connection of said signalling contact shoe to the power circuit on the vehicle, and a traffic control circuit regulated by the energization of said traffic control relay, said traffic control circuit including a selected section of blocking conductor bar and forming a shunt circuit which disables the block control relay of a vehicle whose blocking contact shoe engages said selected section of blocking conductor bar.

8. A block control system according to claim 7, wherein one of said selected sections of signalling conductor bar and blocking conductor bar is a main line section and the other of said selected sections is a spur line section.

9. A block control system for self-propelled vehicles operable on a track layout having main and spur line tracks connected by a track switch; and insulated sections of main and spur line signalling and blocking conductor bars extending parallel to the main and spur line tracks; each vehicle having a driving motor, a power circuit therefor energizable through collector shoes engageable with conductor rails of a power source extending parallel to the main and spur line tracks, a block control relay operable to control the energization of the driving motor, a signalling contact shoe and a blocking contact shoe connected to the power circuit and engageable respectively with the signalling and blocking conductor bars, the block control relay being connected to the blocking contact shoe and being operable in response to the potential applied to the section of blocking conductor bar engaged by the blocking contact shoe; wherein the improvement comprises:

a first traffic control relay connected to a selected main line section of signalling conductor bar and to one side of the power source;

a second traffic control relay connected to a selected section of spur line signalling conductor bar and to one side of the power source;

said traffic control relays each being energizable in response to engagement of its respective selected section of signalling conductor bar by the signalling contact shoe of a vehicle through the connection of said signalling contact shoe to the power circuit on the vehicle;

and a first traffic control circuit regulated by the energization of one of said traffic control relays, one of said traffic control relays being operable to disable the other of said traffic control relays.

10. A block control system according to claim 9, wherein said traffic control circuit includes a selected section of blocking conductor bar and applies a blocking signal thereto.

11. A block control system according to claim 9, wherein said first traffic control relay regulates said first traffic control circuit which includes a selected section of spur line blocking conductor bar, and said second traffic control relay regulates a second traffic control circuit which includes a selected section of main line blocking conductor bar.

12. A block control system according to claim 9, wherein the main and spur line signalling and blocking conductor bar sections are arranged in a plurality of successive main and spur line traffic control zones which merge at the track switch, and said first traffic control relay is energizable in response to the engagement of the signalling conductor bar section of a traffic control zone on one of the main and spur lines and regulates said first traffic control circuit which includes the blocking conductor bar section of a traffic control zone on the other of the main and spur lines.

13. A block control system according to claim 12, wherein said second traffic control relay is operable to disable said first traffic control relay and to regulate a second traffic control circuit which includes the blocking conductor bar section in the traffic control zone of said first traffic control relay.

14. A block control system according to claim 13, wherein said first and second traffic control relays have contacts arranged in a gating circuit connecting the main and spur line signalling conductor bar sections in corresponding main and spur line traffic control zones to the main and spur line blocking conductor bar sections in the preceding main and spur line traffic control zones.

15. A block control system for self-propelled vehicles operable on a track layout having main and spur line tracks connected by a track switch; and insulated sections of main and spur line signalling and blocking conductor bars extending parallel to the main and spur line tracks; each vehicle having a driving motor, a power circuit therefor energizable through collector shoes engageable with conductor rails of a power source extending parallel to the main and spur line tracks, a block control relay operable to control the energization of the driving motor, a signalling contact shoe and a blocking contact shoe connected to the power circuit and engageable respectively with the signalling and blocking conductor bars, the block control relay being connected to the blocking contact shoe and being operable in response to the potential applied to the section of blocking conductor bar engaged by the blocking contact shoe; wherein the improvement comprises:

a first traffic control relay connected to a selected section of signalling conductor bar and to one side of the power source is energizable in response to engagement of the selected section of signalling conductor bar by the signalling contact shoe of a vehicle through the connection of said signalling contact shoe to the power circuit on the vehicle, a traffic control circuit regulated by the energization of said traffic control relay, and a section of blocking conductor bar in advance of the track switch is connected to one side of the power source through a switch responsive to the position of the track switch.

* * * * *